(12) United States Patent
Packham (10) Patent No.: US 7,343,931 B2
(45) Date of Patent: Mar. 18, 2008

(54) QUICK-DISCONNECT COUPLER

(76) Inventor: Trent Packham, 931 Benson La., Ft. Collins, CO (US) 80525

( * ) Notice: Subject to any disclaimer, the term of this patent is extended or adjusted under 35 U.S.C. 154(b) by 0 days.

(21) Appl. No.: 11/503,089

(22) Filed: Aug. 10, 2006

(65) Prior Publication Data

US 2007/0272314 A1    Nov. 29, 2007

Related U.S. Application Data

(60) Provisional application No. 60/802,917, filed on May 23, 2006.

(51) Int. Cl.
*F16L 37/34* (2006.01)
(52) U.S. Cl. .................... 137/614.04; 137/614.03; 251/149.6
(58) Field of Classification Search ........ 137/614.03, 137/614.04, 614.05; 251/149.1, 149.6, 149.5
See application file for complete search history.

(56) References Cited

U.S. PATENT DOCUMENTS

| 4,181,149 A * | 1/1980 | Cox ................. 251/149.6 |
| 5,090,448 A * | 2/1992 | Truchet ............. 137/614.03 |
| 7,028,982 B2 * | 4/2006 | Kohda .............. 137/614.05 |

* cited by examiner

*Primary Examiner*—Kevin Lee
(74) *Attorney, Agent, or Firm*—Richard Calderwood (57) ABSTRACT

A quick-dis/connect coupler including two coupler modules, male and female. Each includes a housing. At least one includes a stopcock valve. The housing bodies are configured such that, as they are engaged/disengaged, each automatically opens/closes the other's stopcock valve. The complete coupler may include seven or fewer components, with five or fewer skus among them. The coupler provides a straight-through, laminar fluid flow path with no dead zones and essentially zero occlusion, and has no springs or other such components inside the fluid flow. The coupler uses inexpensive injection molding and snap-fit components which are dual-latched. The valve-closing springs also provide positive eject force upon disengagement of the coupler.

15 Claims, 9 Drawing Sheets

QUICK-DISCONNECT COUPLER

RELATED APPLICATION

This application claims filing priority benefit of a provisional application 60/802,917 entitled "Medical Device Couplers" filed May 23, 2006 by this inventor, which is incorporated herein by reference.

BACKGROUND OF THE INVENTION

1. Technical Field of the Invention

This invention relates generally to couplers for connecting fluid-carrying tubes, and more specifically to an improved quick-dis/connect coupler of the type having two mating components, each for coupling to a respective one of two tubes to be connected.

2. Background Art

A variety of quick-dis/connect couplers are known in many industries for use in connecting tubes, hoses, and the like. Quick-dis/connect couplers are used to connect and disconnect tubes, hoses, pipes, and other fluid-carrying implements (hereafter generically "tubes"). Quick-dis/connect couplers are not merely connectors; their function is not merely to mechanically connect the tubes. They also serve to interrupt the flow of fluid when disconnected, and permit the flow of fluid when connected. The fluid may be any gas, liquid, emulsion, suspension, solution, etc.

Most quick-dis/connect couplers employ any of a variety of complex mechanisms employing poppet valves. One disadvantage of poppet valves is that they result in tortuous fluid flow paths. Furthermore, most commercially successful models are constructed such that one or more coil springs are actually disposed within the fluid flow path inside the coupler. Another serious shortcoming of commercially available quick-dis/connect couplers is that they are constructed of fifteen or more separate components. The high component count causes increased manufacturing and assembly cost, increased inventory requirements, and reduced product reliability.

What is needed, then, is an improved quick-dis/connect coupler which has a significantly reduced component count, a significantly less tortuous flow path, and no springs or other obstructions directly in the fluid flow path.

DETAILED DESCRIPTION

The invention will be understood more fully from the detailed description given below and from the accompanying drawings of embodiments of the invention which, however, should not be taken to limit the invention to the specific embodiments described, but are for explanation and understanding only.

Figure 1:
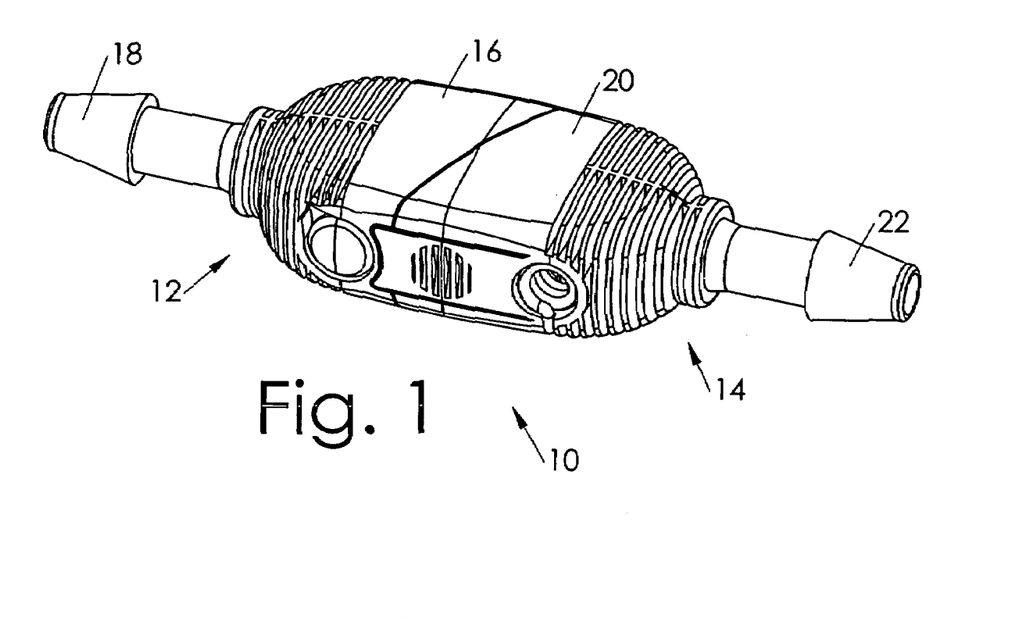
FIG. 1 shows a quick-dis/connect coupler according to one embodiment of this invention.

FIG. 1 illustrates a quick-dis/connect coupler 10 according to one embodiment of this invention. The quick-dis/connect coupler includes a female coupler module 12 and a male coupler module 14.

The female coupler module includes a female coupler housing 16 which has a connector 18 for connecting to a tube (not shown). The male coupler module includes a male coupler housing 20 which has a connector 22 for connecting to a tube (not shown). Although the tube connectors are, for convenience, illustrated as being of the barbed type commonly used with flexible tubing, any sort of connector can be used in practicing this invention.

Figure 2:
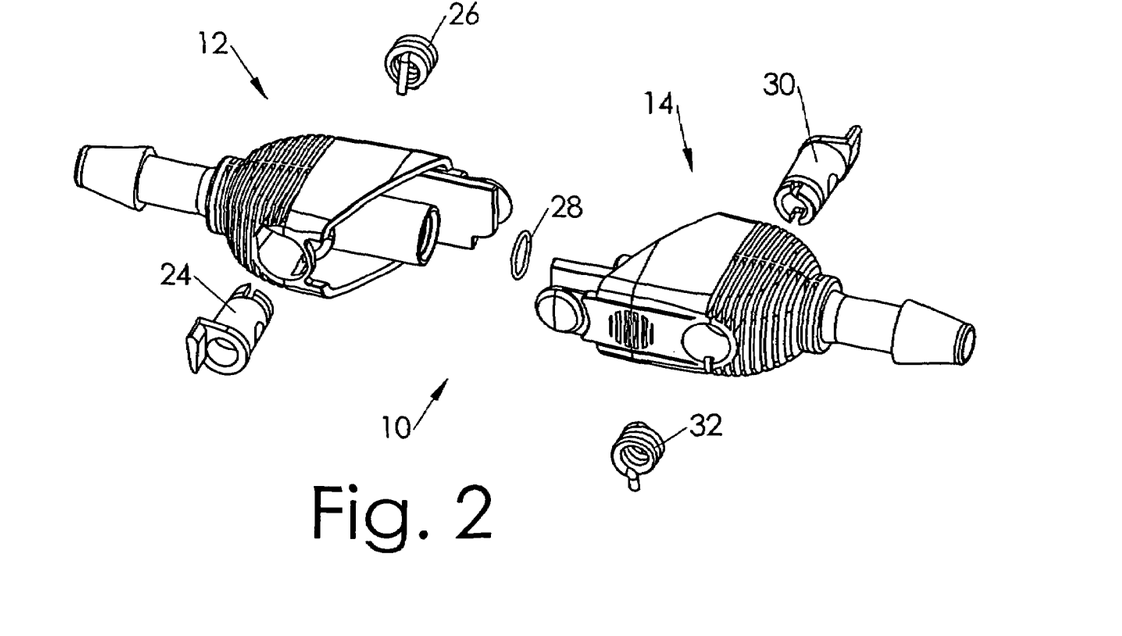
FIG. 2 shows an exploded view of the quick-dis/connect coupler of FIG. 1.

FIG. 2 illustrates the quick-dis/connect coupler 10 shown in an exploded view. In one embodiment, the quick-dis/connect coupler includes only seven components. The female coupler module 12 includes the female coupler housing 16, a stopcock valve 24, a stopcock torsion spring 26, and an o-ring 28. The male coupler module 14 includes the male coupler housing, a stopcock valve 30, a stopcock torsion spring 32.

Figure 3:
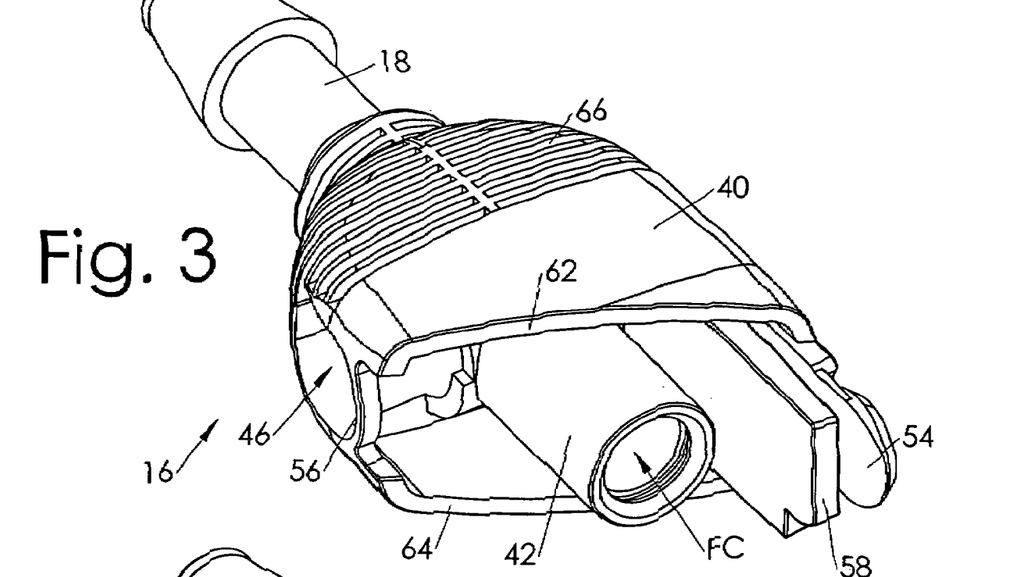
FIGS. 3-5 show a female coupler module of the quick-dis/connect coupler of FIG. 1 in plan view and a pair of cutaway views.
Figure 4:
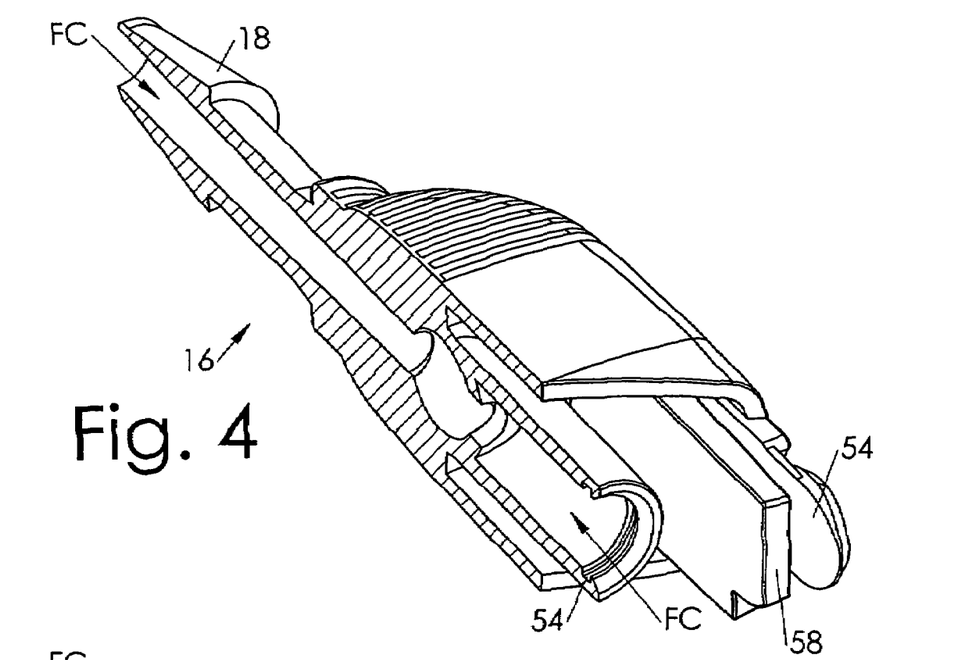
Figure 5:
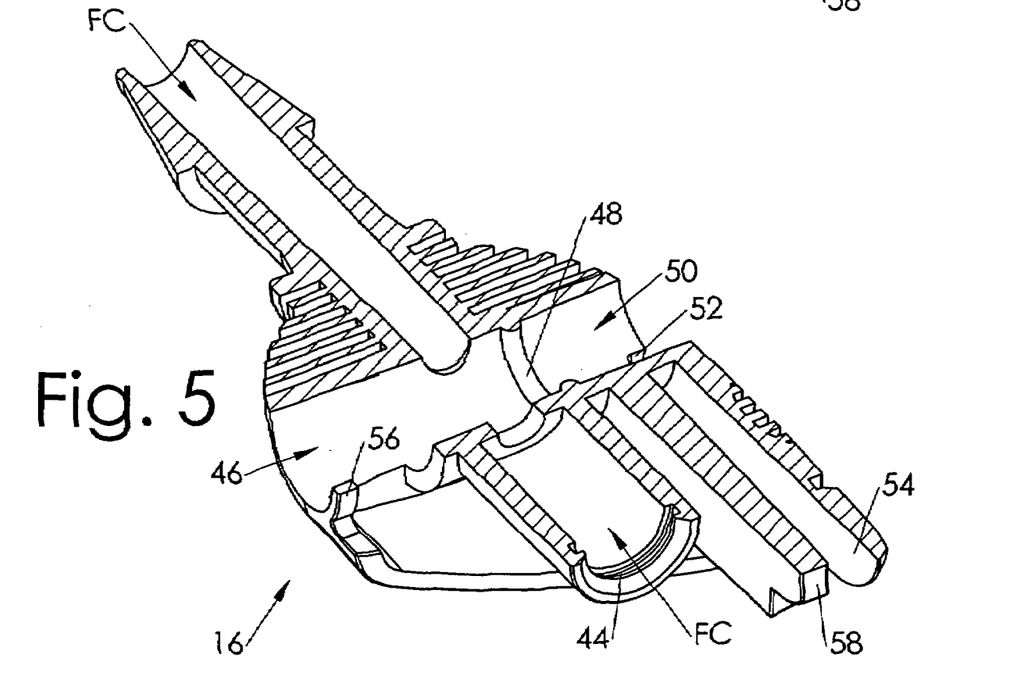

FIG. 3 illustrates details of the female coupler housing 16 in plan view, and FIGS. 4 and 5 illustrate details of the female coupler housing cross-sectioned in two different ways. The female coupler housing is in substantially the same orientation in FIGS. 3-5.

The female coupler housing includes a body 40 from which the tube connector 18 protrudes in one direction and a coupler connector 42 protrudes in another (preferably but not necessarily opposite) direction. The female coupler housing is formed to include a flow channel FC extending through the tube connector and the coupler connector. The flow channel is denoted by arrows extending in both directions, indicating that fluid can flow in either direction through the coupler housing.

The female coupler connector 42 includes an o-ring retention groove 44 in which the o-ring (not shown) is disposed.

The female coupler housing includes a stopcock valve receiver bore 46 in which the stopcock valve (not shown) is disposed. The stopcock valve receiver bore includes an annular retention ridge 48 which engages a corresponding annular groove on the stopcock valve. Alternatively the ridge and groove could be reversed, with the groove being on the coupler housing and the ridge being on the stopcock valve.

The female coupler housing further includes a stopcock torsion spring receiver bore 50 in which the stopcock torsion spring (not shown) is disposed. A spring retention notch 52 engages one end of the spring to provide a torsional engagement point. In some embodiments, the notch also grasps the spring to prevents the spring from accidentally falling out of position.

The female coupler housing includes a coupler engagement tab 54 and, on the other side of the housing, a coupler engagement ring 56. When the two coupler modules are mated (as shown in FIG. 1), each module's coupler engagement tab locks into the other module's coupler engagement ring.

The female coupler housing includes a stopcock cam actuator 58. When the two coupler modules are mated, each module's cam actuator engages the other module's stopcock valve and rotates it into the open or "flow ON" position. When the two coupler modules are unmated, each module's cam actuator pulls away from the other module's stopcock valve and allows the other module's stopcock torsion spring to rotate the stopcock valve back into the closed or "flow OFF" position.

The engagement tabs, engagement rings, cam actuators, coupler connectors, etc. of the two coupler housings are dimensioned such that, during mating engagement, the coupler connectors seal before the cam actuators open the valves, and during unmating disengagement, the cam actuators allow the springs to close the valves before the coupler connectors unseal. This prevents spillage.

The female coupler housing includes one or more mating surfaces 62, 64 which are dimensioned to mate with corresponding surfaces of the male coupler housing.

Optionally, the female coupler housing includes ribs 66 or other grip-enhancing texture items for improving the user's ability to engage and disengage the coupler modules. The texture items can also be used to increase effective exterior dimensions in predetermined portions of the coupler, while preserving the ability to use injection molding manufacturing techniques.

Figure 6:
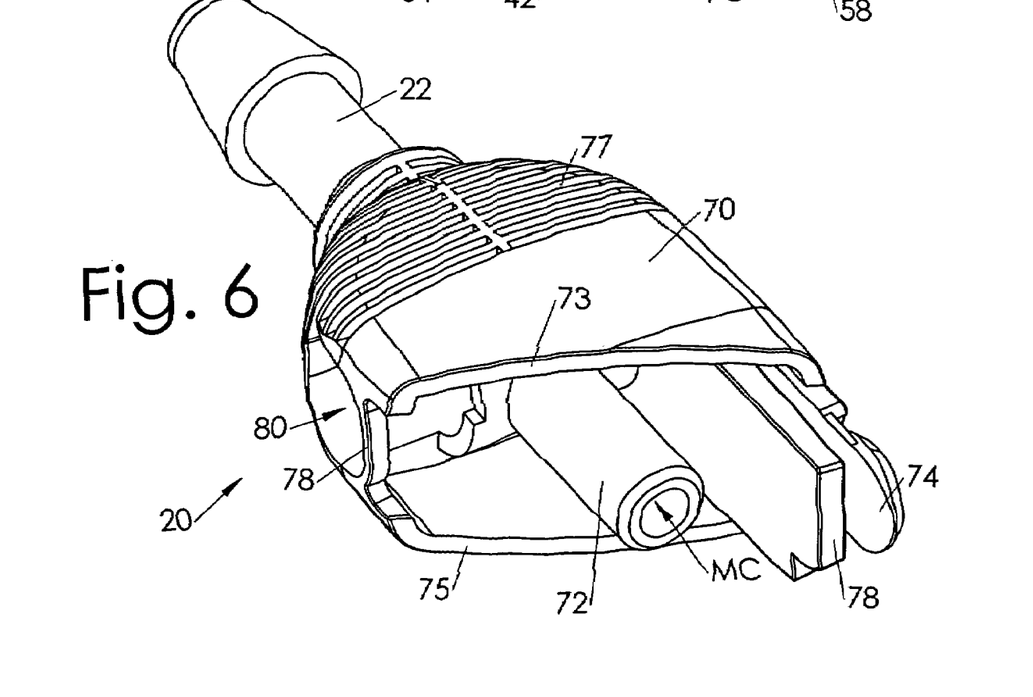
FIGS. 6-8 show a male coupler module of the quick-dis/connect coupler of FIG. 1 in plan view and a pair of cutaway views.
Figure 7:
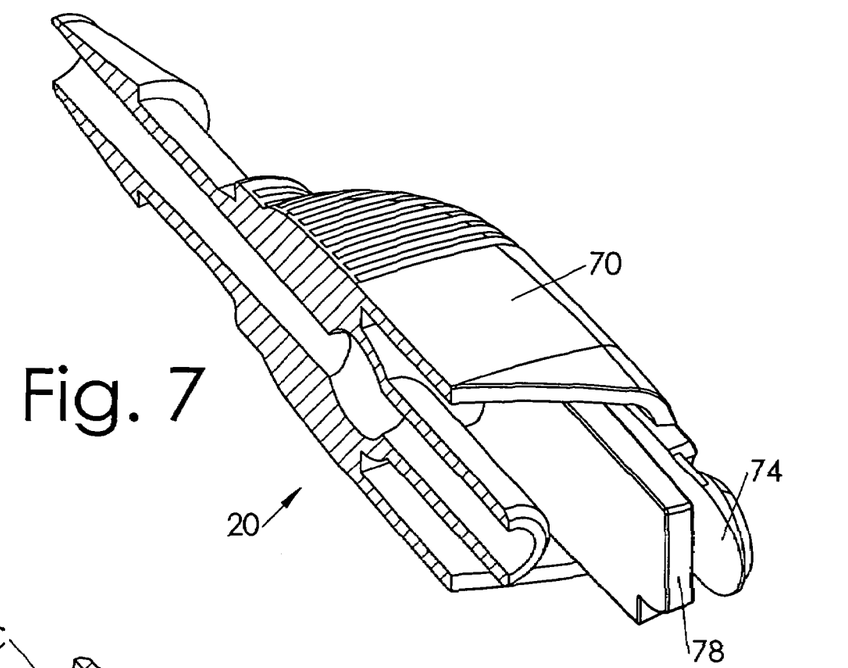
Figure 8:
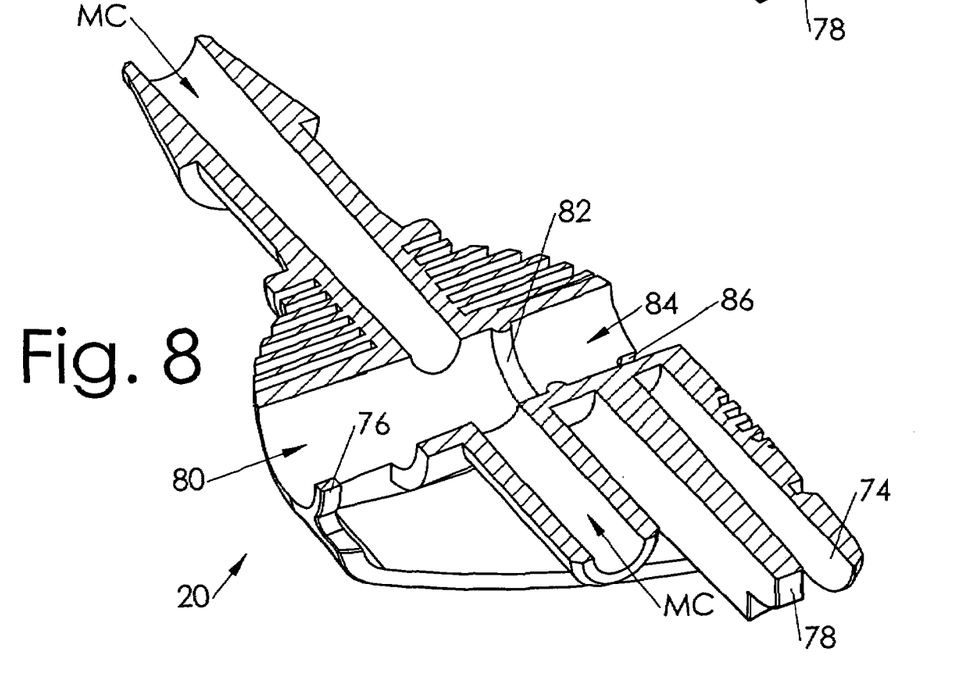

FIGS. 6-8 illustrate the male coupler housing 20. Optionally but advantageously, the male coupler housing is made with nearly identical construction as the female coupler housing. This enables the two housings to be made and assembled using substantially the same injection molding machinery and tooling, and also improves the similarity with which the male and female housings respond to environmental changes thus maintaining fit and function of the coupler.

The male coupler housing includes a body 70 which has a tube connector 22, a male coupler connector 72, a coupler engagement tab 74, a coupler engagement ring 76, a stopcock cam actuator 78, a flow channel MC, a stopcock valve receiver bore 80 with an annular retention ridge 82, and a stopcock spring receiver bore 84 with a spring retention notch 86.

The outer surface of the male coupler connector is dimensioned to sufficiently engage the o-ring (not shown) to prevent leakage while permitting repeated dis/engagement. The terminal end of the male coupler connector may advantageously be chamfered or radiused, to enable easier insertion through the o-ring and to reduce damage to the o-ring.

The dimensions of both male and female tube connections are such that the FC is sealed before the valves can be rotated to the open flow position. Likewise, the dimensions of both male and female tube connections are such that the FC remains sealed until the valves are rotated to the stopped flow or closed position.

Figures 9, 10:
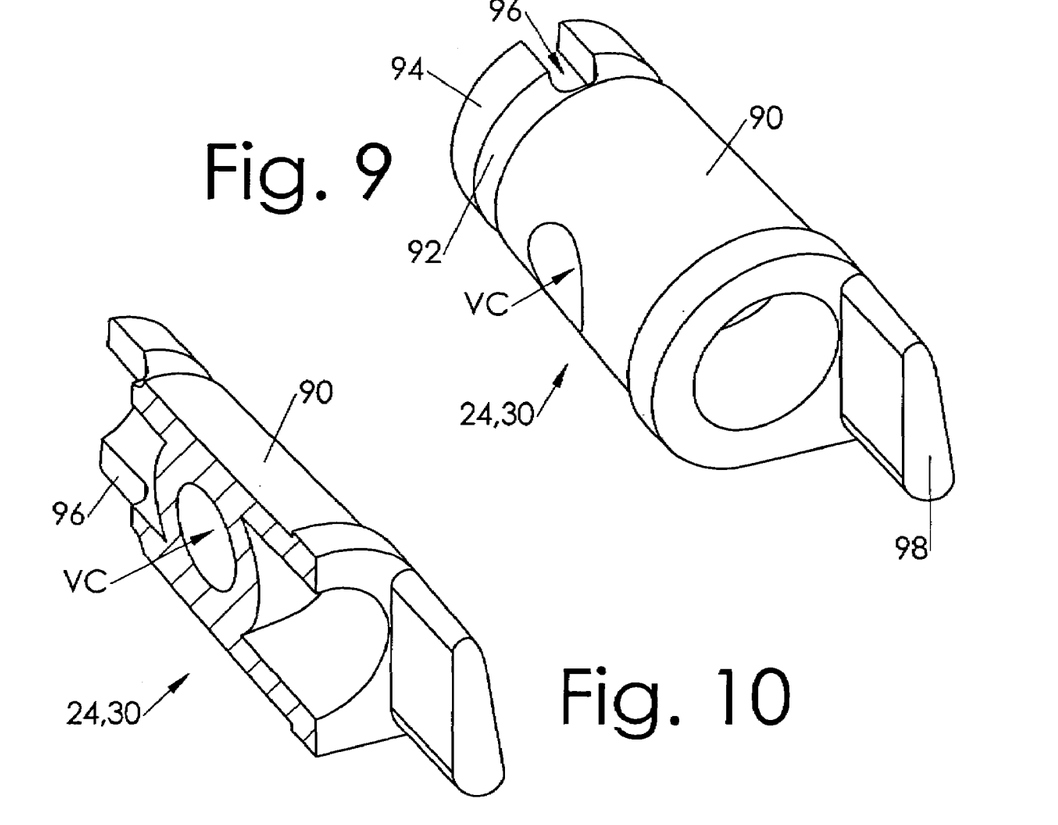
FIGS. 9-11 show a stopcock valve such as may be used in each of the coupler modules.
Figure 11:
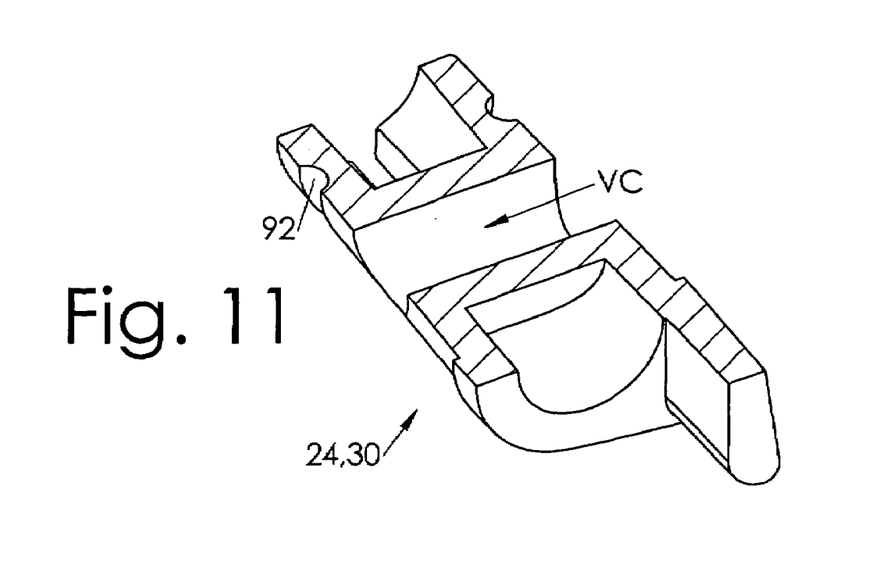

FIGS. 9-11 illustrate the stopcock valve 24, 30 such as may be used in the quick-dis/connect coupler, shown in plan view and two cross-section views. The stopcock valves used in the male and female modules may advantageously, but not necessarily, be identical, enabling the manufacturer to use a single sku and simplify parts procurement, inventory, manufacturing, and assembly.

The stopcock valve includes a body 90 which is dimensioned to fit within the stopcock valve receiver bore of the coupler housing (not shown). In one embodiment, both the bore and the valve body are dimensioned according to the medical industry standard Luer taper. In other embodiments, other tapers or no taper are used.

The stopcock valve includes a valve flow channel VC which, when the stopcock valve is disposed within the coupler housing, substantially aligns with the flow channel of the housing. The stopcock valve includes an annular retention groove 92 which engages the annular retention ridge of the coupler housing, to hold the stopcock valve in correct axial position engagement within the stopcock valve receiver bore of the coupler housing. Optionally but advantageously, the end 94 of the body beyond the retention groove may include a compression relief notch 96 which enables the end to radially compress as it is inserted past the retention ridge. This notch also serves to torsionally engage the stopcock torsion spring (not shown), and may also provide positive retention of the spring.

The stopcock valve includes a cam lever 98 which is engaged by the stopcock cam actuator of the coupler housing (not shown).

Figure 12:
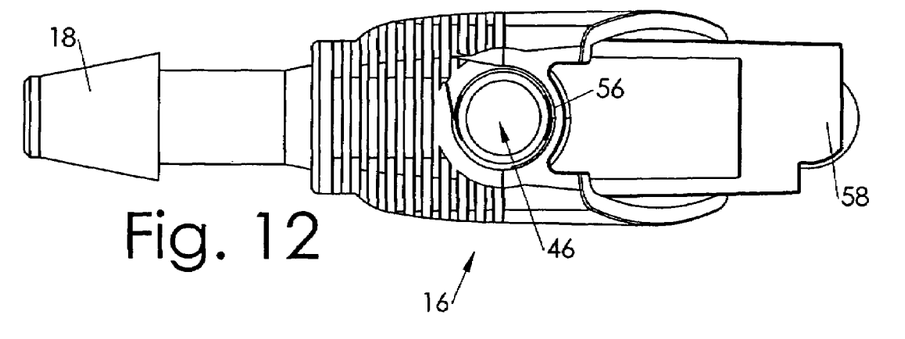
FIGS. 12-14 show a female coupler housing in left side, right side, and top views.
Figure 13:
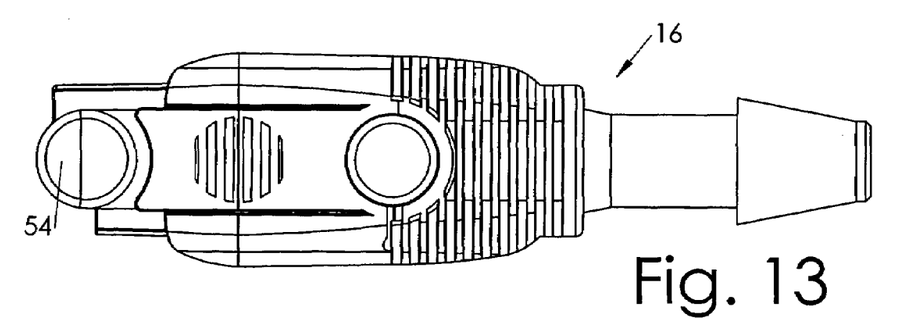
Figure 14:
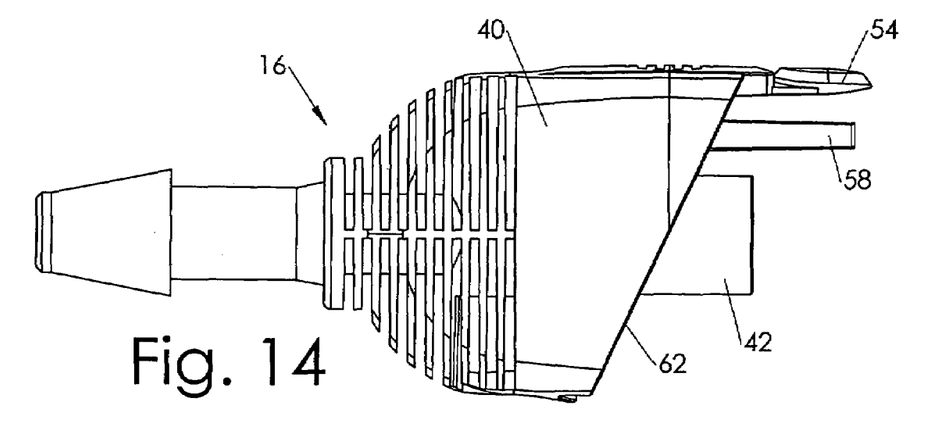

FIGS. 12-14 illustrate the female coupler housing 16 in left side, right side, and top views, respectively. The coupler housing includes a body 40 with a tube connector 18, a coupler connector 42, a coupler engagement tab 54, a coupler engagement ring 56, a stopcock receiver bore 46, and a mating surface 62. The mating surface may advantageously be angled, as shown, to provide a longitudinal offset from the coupler engagement tab to the coupler engagement ring.

Figure 15:
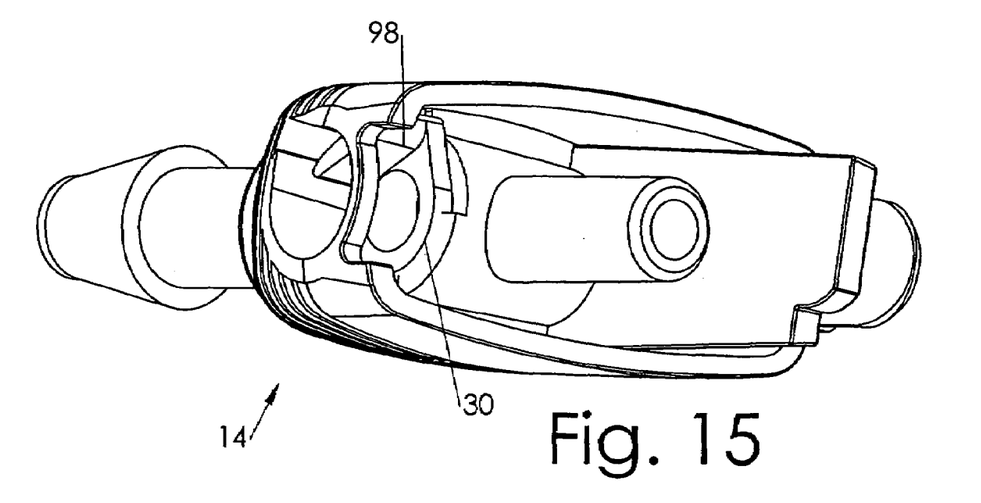
FIGS. 15-16 show plan views of the male coupler module with its stopcock valve in the closed and open positions, respectively.

FIG. 15 illustrates the male coupler module 14 in plan or perspective view, with the stopcock valve 30 in a closed or "flow OFF" position. In this position, the stopcock torsion spring (not visible) holds the stopcock valve in a rotational position such that the cam lever 98 is angled back toward the mating surface/coupler connector end of the module.

Figure 16:
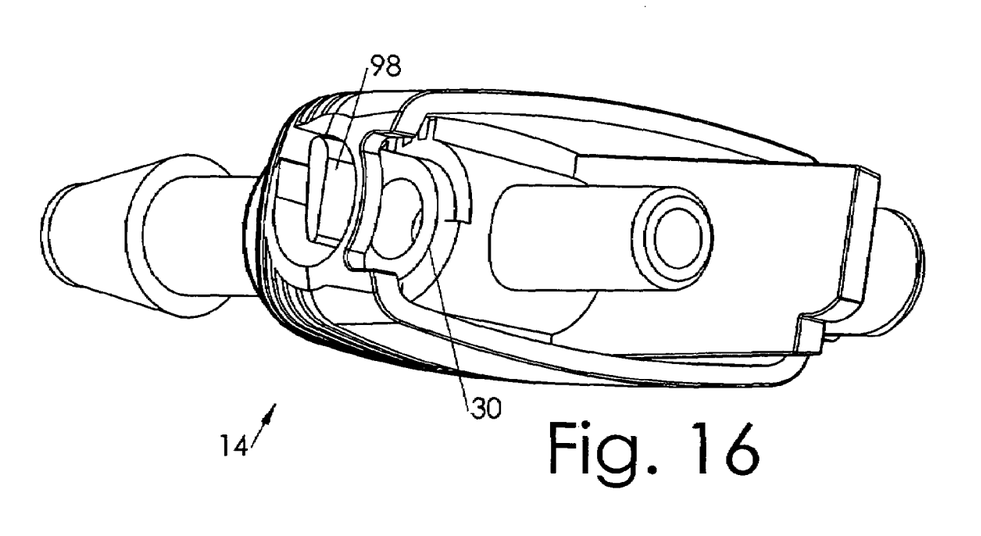

FIG. 16 illustrates the male coupler module 14 with the stopcock valve 30 in an open or "flow ON" position. In this position, the cam actuator of the female module (not shown) has engaged the cam lever 98 and pushed or rotated it toward the tube connector end of the male coupler module. This puts the stopcock torsion spring (not visible) under strain. When the modules are disengaged, the male module's stopcock torsion spring will return the stopcock valve to its closed position.

Figure 17:
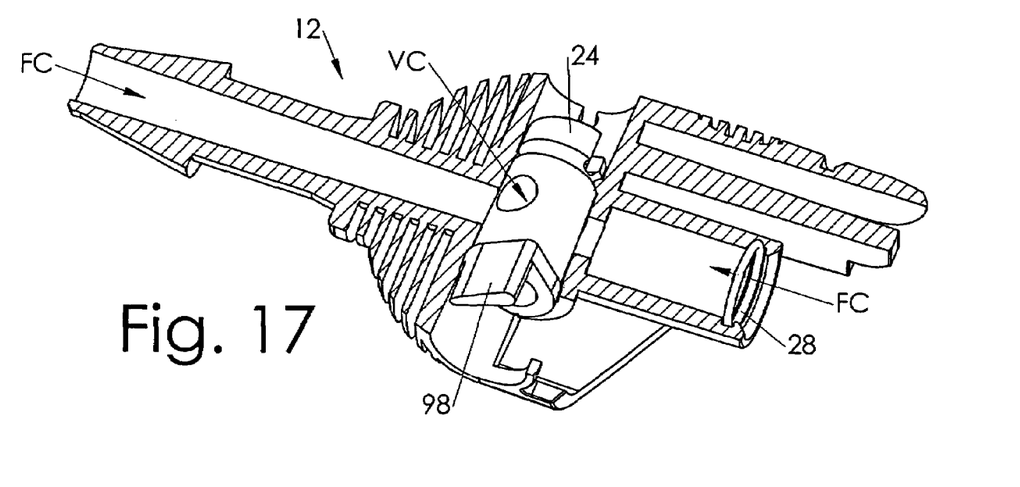
FIGS. 17-18 show the female coupler module with its stopcock valve in the closed and open positions, and the female coupler housing cross-sectioned to show the stopcock valve and o-ring.
Figure 18:
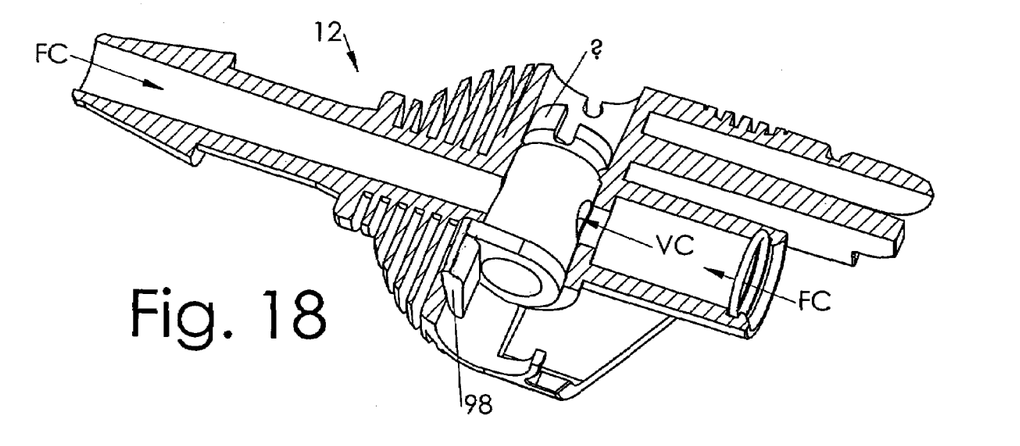

FIGS. 17-18 illustrate the corresponding operation of the female coupler module 12. When the modules are disengaged, as shown in FIG. 17, the stopcock torsion spring holds the stopcock valve 24 in the closed position, in which the valve flow channel VC is not axially aligned with the housing's flow channel FC, preventing fluid from flowing through the module. The o-ring is shown only to illustrate its placement within the o-ring retention groove. When the modules are engaged, as shown in FIG. 18, the cam actuator of the male module (not shown) has pressed the cam lever 98 of the stopcock valve 24, rotating the stopcock valve until the valve flow channel VC is substantially aligned with the housing's flow channel FC, permitting fluid flow through the module.

Figure 19:
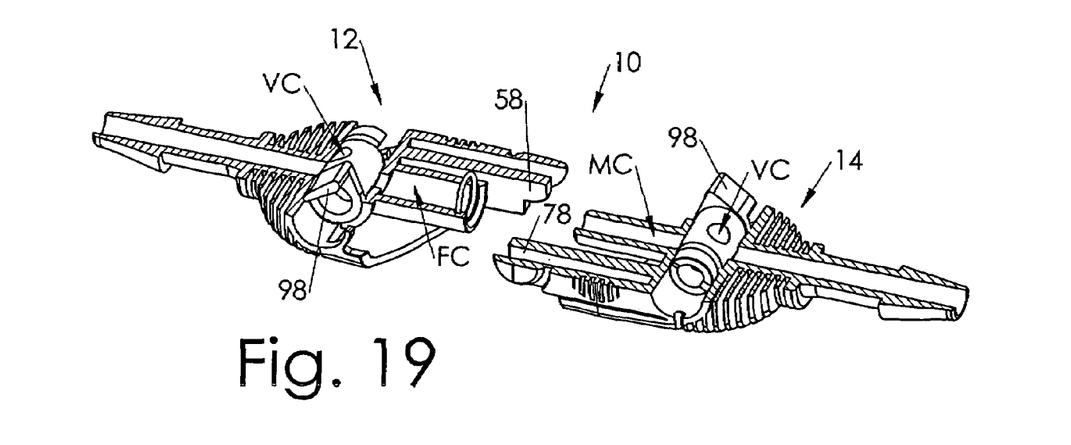
FIG. 19 shows the quick-dis/connect coupler with its two coupler modules disconnected, and its male and female housings cross-sectioned.

FIG. 19 illustrates a quick-dis/connect coupler 10 in which the female coupler module 12 and the male coupler module 14 are disengaged. The stopcock valves are in their closed positions.

Figure 20:
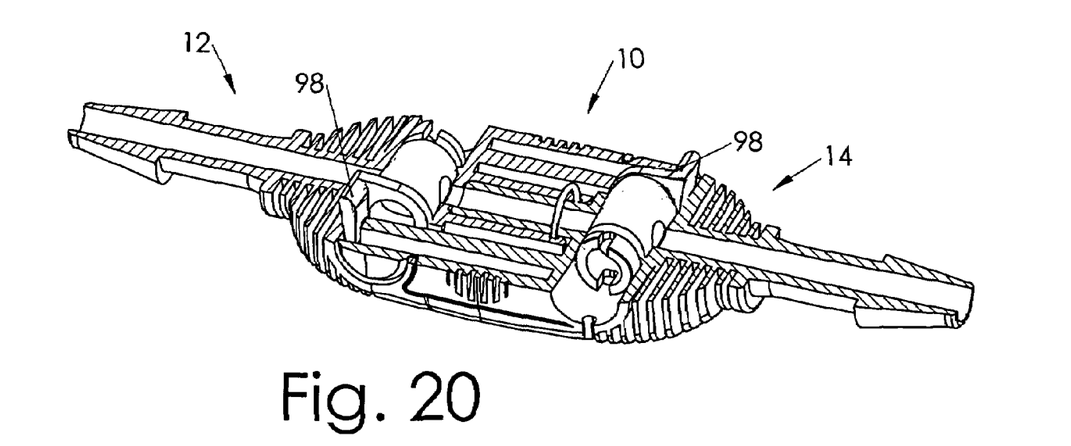
FIG. 20 shows the quick-dis/connect coupler with its two modules connected, illustrating each housing engaging and opening the other module's stopcock valve.

FIG. 20 illustrates the quick-dis/connect coupler 10 in which the female coupler module 12 and the male coupler module 14 are engaged. Each module's cam actuator has rotated the other module's cam lever 98, and each stopcock valve has therefore rotated into its open position. For better comprehensibility, only the housings are cross-sectioned, and the springs are omitted.

In one embodiment, intended for use in applications in which it is desirable that fluid leakage be prevented from both tubes when the quick-dis/connect coupler is decoupled, each of the two coupler modules includes a valve. In another embodiment, intended for use in applications in which it is important to prevent leakage from only one tube (e.g. the supply or in-flow side), only one of the coupler modules needs to include a valve. In such case, one coupler module includes a valve (and optionally no cam actuator), and the other coupler module includes a cam actuator. The latter module either lacks the lateral bores in which the valve and spring would otherwise reside, or those bores have been plugged.

CONCLUSION

In one embodiment, the coupler housings are constructed of injection molded plastic. In one such embodiment, polycarbonate is used. In other embodiments, the coupler housings are constructed of other materials, suitable for particular applications.

In one embodiment, the stopcock valves are constructed of injection molded plastic. In one such embodiment, HDPE or polyethylene is used. In other embodiments, the stopcock valves are constructed of other materials, suitable for particular applications.

In one embodiment, the stopcock torsion springs are constructed of stainless steel. In other embodiments, the stopcock valves are constructed of other materials, suitable for particular applications.

Although the coupler connectors have been illustrated as being specifically male and female, other configurations are conceivable within the principles of this invention. For example, each could have an identical butt connector having an o-ring retention groove in its mating surface, and the o-ring could thereby be sandwiched between the connectors when the modules are fully engaged, thus preventing spillage when disconnected.

Although the coupler mating has been illustrated as an axial sliding engagement, other configurations are conceivable within the principles of this invention. For example, rather than mating by sliding axially together, the two coupler modules could screw together, and each could have a cam actuating cylinder which engages the other's valve cam lever, slowly opening the stopcock valves as the modules are screwed together.

Although the valve-closing force has been illustrated as being provided by a separate spring component, in other embodiments it could be provided by the stopcock valve itself. In other words, the stopcock valve and the spring could be formed as one monolithic component, thus creating a five-piece coupler having no metal parts, which may be advantageous in some industrial applications and may further reduce cost.

When one component is shown or said to be adjacent another component, it should not be interpreted to mean that there is absolutely nothing between the two components, only that they are in the order indicated.

The various features illustrated in the figures may be combined in many ways, and should not be interpreted as though limited to the specific embodiments in which they were explained and shown.

Those skilled in the art, having the benefit of this disclosure, will appreciate that many other variations from the foregoing description and drawings may be made within the scope of the present invention. Indeed, the invention is not limited to the details described above. Rather, it is the following claims including any amendments thereto that define the scope of the invention.

The invention claimed is:

1. A quick-coupler comprising:
(1) a first coupler module including,
   (a) a housing having a body including,
      (i) a tube connector,
      (ii) a coupler connector,
      (iii) a flow channel through the tube connector and the coupler connector, and
      (iv) a stopcock valve receiver bore,
   (b) a stopcock valve disposed within the stopcock valve receiver bore and having a body including,
      (i) a valve channel through the body, and
      (ii) a cam lever, and
   (c) a spring engaged with the housing and the stopcock valve; and
(2) a second coupler module including,
   (a) a housing having a body including,
      (i) a tube connector,
      (ii) a coupler connector,
      (iii) a flow channel through the housing, and
      (iv) a cam actuator;
wherein the earn actuator is disposed at a location on the second coupler's housing, and the cam lever is disposed at a location on the stopcock valve, such that when the first and second couplers are engaged, the cam actuator activates the cam lever, thereby opening the stopcock valve by rotating the valve channel into fluid flow communication with the flow channels.

2. The quick-disconnect coupler of claim 1 wherein:
the second coupler module further includes,
   (b) a stopcock valve disposed within a stopcock receiver bore of the housing body of the second coupler module and having a cam lever, and
   (c) a spring engaged with the housing and the stopcock valve of the second coupler module;
the housing body of the first coupler module further includes,
   (v) a cam actuator,
wherein each module's cam actuator is located on its respective housing, and each module's cam lever is located on its respective stopcock valve, such that when the first and second couplers are engaged, each module's cam actuator activates the other module's cam lever, thereby opening both stopcock valves.

3. The quick-disconnect coupler of claim 1 wherein:
the first coupler module's housing body further includes,
   (v) a substantially annular valve retention ridge disposed within the stopcock valve receiver bore; and
the stopcock valve body further includes
   (iii) a substantially annular valve retention groove configured to engage with the valve retention ridge when the stopcock valve is operably disposed within the first housing.

4. The quick-coupler of claim 3 wherein the stopcock valve body further includes:
a compression relief notch in an end of the stopcock valve body which is inserted beyond the valve retention ridge.

5. The quick-disconnect coupler of claim 4 wherein:
the compression relief notch is adapted to engage the spring.

6. The quick-coupler of claim 1 wherein:
the housing body of one of the coupler modules further includes a coupler engagement tab; and
the housing body of the other coupler module further includes a coupler engagement ring;
whereby, when the coupler modules are engaged, the coupler engagement ring retains the coupler engagement tab to secure the coupler modules together.

7. The quick-disconnect coupler of claim 6 wherein:
the housing body of each coupler module includes both a coupler engagement tab and a coupler engagement ring;
whereby, when the coupler modules are engaged, each coupler module's coupler engagement ring retains the other module's coupler engagement tab to secure the coupler modules together.

8. The quick-disconnect coupler of claim 1 wherein:
the spring is disposed entirely outside a fluid flow path through the quick-dis/connect coupler.

9. A quick-disconnect coupler for connecting two tubes, the quick-coupler comprising:
a pair of coupler modules each including,
(a) a stopcock valve having a cam lever and a valve channel,
(b) a housing body having a tube connector for connecting to a respective one of the tubes, a coupler connector for connecting to the coupler connector of the other coupler module, a flow channel extending through the tube connector, a flow channel extending through the coupler connector, a stopcock receiver bore, a cam and means for releasably mechanically engaging the other coupler module, and
(c) a spring coupled to the stopcock valve and to the housing body so as to hold the stopcock valve in a closed configuration when the coupler module is not engaged with the other coupler module;
wherein each coupler module's earn actuator is configured to activate the other coupler module's stopcock valve's cam lever when the coupler modules are engaged, thereby rotating the other coupler module's stopcock valve such that its valve channel connects the flow channels of its housing body, and wherein the coupler connectors of the coupler modules are configured to connect when the coupler modules are engaged.

10. The quick-coupler of claim 9 wherein each coupler module's tube connector comprises:
a barbed connector for connecting to flexible tubing.

11. The quick-disconnect coupler of claim 9 wherein:
when the coupler modules are engaged, the flow channels through the tube connectors, the valve channels through the stopcock valves, and the flow channels through the coupler connectors together form a substantially straight-through flow path.

12. The quick-disconnect coupler of claim 9 wherein:
the coupler connector of one of the coupler modules comprises a female coupler connector; and
the coupler connector of the other coupler modules comprises a male coupler connector which insertably engages the female coupler connector.

13. A coupler for releasably connecting two tubes into flow communication, the coupler comprising less than ten distinct components, the distinct components including at least:
a first housing having a substantially cylindrical stopcock valve bore;
a first substantially cylindrical stopcock valve disposed within the stopcock valve bore of the first housing and governing fluid flow through the first housing;
a first spring coupled to the first housing and the first stopcock valve so as to hold the first stopcock valve in a closed configuration when the apparatus is decoupled;
a second housing a substantially cylindrical stopcock valve bore;
a second substantially cylindrical stopcock valve disposed within the stopcock valve bore of the second housing and governing fluid flow through the second housing;
a second spring coupled to the second housing and the second stopcock valve so as to hold the second stopcock valve in a closed configuration when the apparatus is decoupled;
an o-ring substantially sealing a connection between the first and second housings when the apparatus is coupled;
wherein the first and second housings are configured to releasably engage each other; and
wherein each housing is configured to open the other housing's stopcock valve as the first and second housings are engaged.

14. The coupler of claim 13 wherein:
when the first and second housings are engaged, there are no components disposed within a fluid flow path through the coupler.

15. The coupler of claim 13 wherein:
the springs are disposed entirely outside a fluid flow path through the coupler.

* * * * *